US012664788B2

(12) United States Patent
Na et al.

(10) Patent No.: US 12,664,788 B2
(45) Date of Patent: Jun. 23, 2026

(54) METHOD AND DEVICE FOR VIDEO ANALYSIS BASED ON IMAGE CORRECTION LEARNING MODEL

(71) Applicants: Hyundai Motor Company, Seoul (KR); Kia Corporation, Seoul (KR)

(72) Inventors: Yong Cheon Na, Hwaseong-Si (KR); Min Woo Park, Hwaseong-Si (KR); Eun Seok Jeon, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/931,728

(22) Filed: Oct. 30, 2024

(65) Prior Publication Data

US 2025/0329169 A1      Oct. 23, 2025

(30) Foreign Application Priority Data

Apr. 17, 2024      (KR) ........................ 10-2024-0051462

(51) Int. Cl.
*G06V 20/56*          (2022.01)
*B60W 60/00*          (2020.01)
(52) U.S. Cl.
CPC ........... *G06V 20/56* (2022.01); *B60W 60/001* (2020.02); *G06V 2201/07* (2022.01)
(58) Field of Classification Search
None
See application file for complete search history.

(56) References Cited

U.S. PATENT DOCUMENTS

| | | | | |
|---|---|---|---|---|
| 10,831,189 B2* | 11/2020 | Kim | ......................... | G06N 3/084 |
| 12,159,467 B1* | 12/2024 | Rasheed | ................. | G06T 17/00 |
| 2018/0089515 A1* | 3/2018 | Yang | ...................... | G06V 20/54 |
| 2020/0074660 A1* | 3/2020 | Oki | ...................... | H04N 13/128 |
| 2020/0218979 A1* | 7/2020 | Kwon | ...................... | G06N 3/08 |
| 2020/0238991 A1* | 7/2020 | Aragon | ................. | G06V 10/454 |
| 2020/0265247 A1* | 8/2020 | Musk | ................... | G06F 18/251 |
| 2020/0349361 A1* | 11/2020 | Oh | ........................ | G05D 1/0088 |
| 2021/0185210 A1* | 6/2021 | Zhu | ........................ | H04N 7/181 |
| 2021/0272304 A1* | 9/2021 | Yang | ................... | G06V 10/454 |
| 2021/0343044 A1* | 11/2021 | Lee | ...................... | G06V 20/588 |
| 2022/0024485 A1* | 1/2022 | Theverapperuma | ........................ | |
| | | | | G01C 21/3635 |
| 2022/0334258 A1* | 10/2022 | Kim | ........................ | G01S 7/497 |
| 2023/0023046 A1* | 1/2023 | Hu | ...................... | G06V 10/443 |
| 2023/0077082 A1* | 3/2023 | Liu | ..................... | G01C 21/3837 |
| 2023/0192116 A1* | 6/2023 | Edwards | ............. | B60W 60/001 |
| | | | | 701/23 |

(Continued)

*Primary Examiner* — Ricky Chin
(74) *Attorney, Agent, or Firm* — Banner & Witcoff, Ltd.

(57) ABSTRACT

An apparatus of a vehicle comprises a memory storing at least one instruction and a processor configured to execute the at least one instruction. The at least one instruction may be configured to cause, when executed by the processor, the apparatus to: via a tuning parameter learning model for image correction, generate, based on received video data, a tuning parameter for adjusting image signal processing (ISP) for correcting the received video data; correct, based on the tuning parameter, the received video data; identify, via a video recognition model, at least one object in at least one image corresponding to the corrected video data; and control, based on the identified at least one object, autonomous driving of the vehicle.

20 Claims, 9 Drawing Sheets

(56) References Cited

U.S. PATENT DOCUMENTS

| | | | | |
|---|---|---|---|---|
| 2023/0254568 A1* | 8/2023 | Iermolenko | .......... | H04N 17/002 |
| | | | | 348/207.99 |
| 2023/0331254 A1* | 10/2023 | Kapoor | ............. | B60W 50/0098 |
| 2023/0351772 A1* | 11/2023 | Poltoraski | ............. | B60W 40/04 |
| 2024/0070955 A1* | 2/2024 | Li | ......................... | G06V 40/174 |
| 2024/0098367 A1* | 3/2024 | Patsekin | ................... | G06T 7/97 |
| 2024/0303963 A1* | 9/2024 | Yang | .................... | G06V 10/751 |
| 2025/0148690 A1* | 5/2025 | Naka | ....................... | G06T 17/00 |
| 2025/0184620 A1* | 6/2025 | Emanuel | ................ | H04N 23/84 |
| 2025/0329169 A1* | 10/2025 | Na | ......................... | G06V 20/56 |

* cited by examiner

Figure 4:
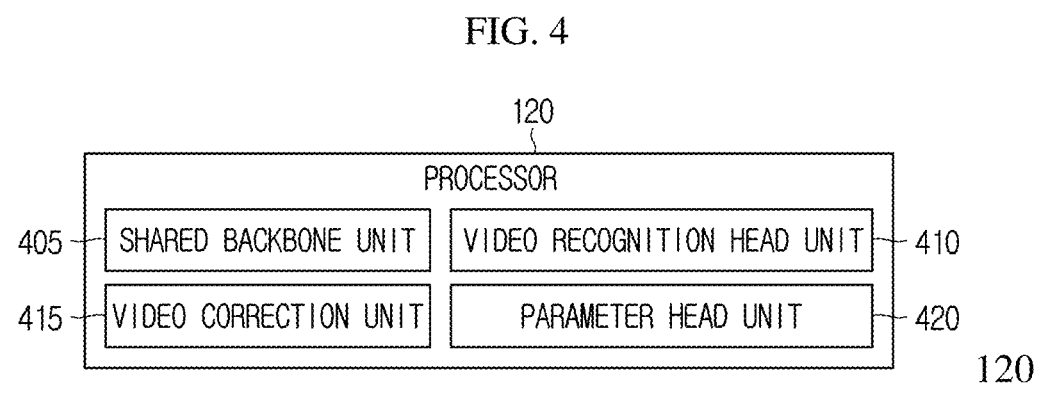

PROCESSOR

405 — SHARED BACKBONE UNIT    VIDEO RECOGNITION HEAD UNIT — 410

415 — VIDEO CORRECTION UNIT    PARAMETER HEAD UNIT — 420

Figure 6:
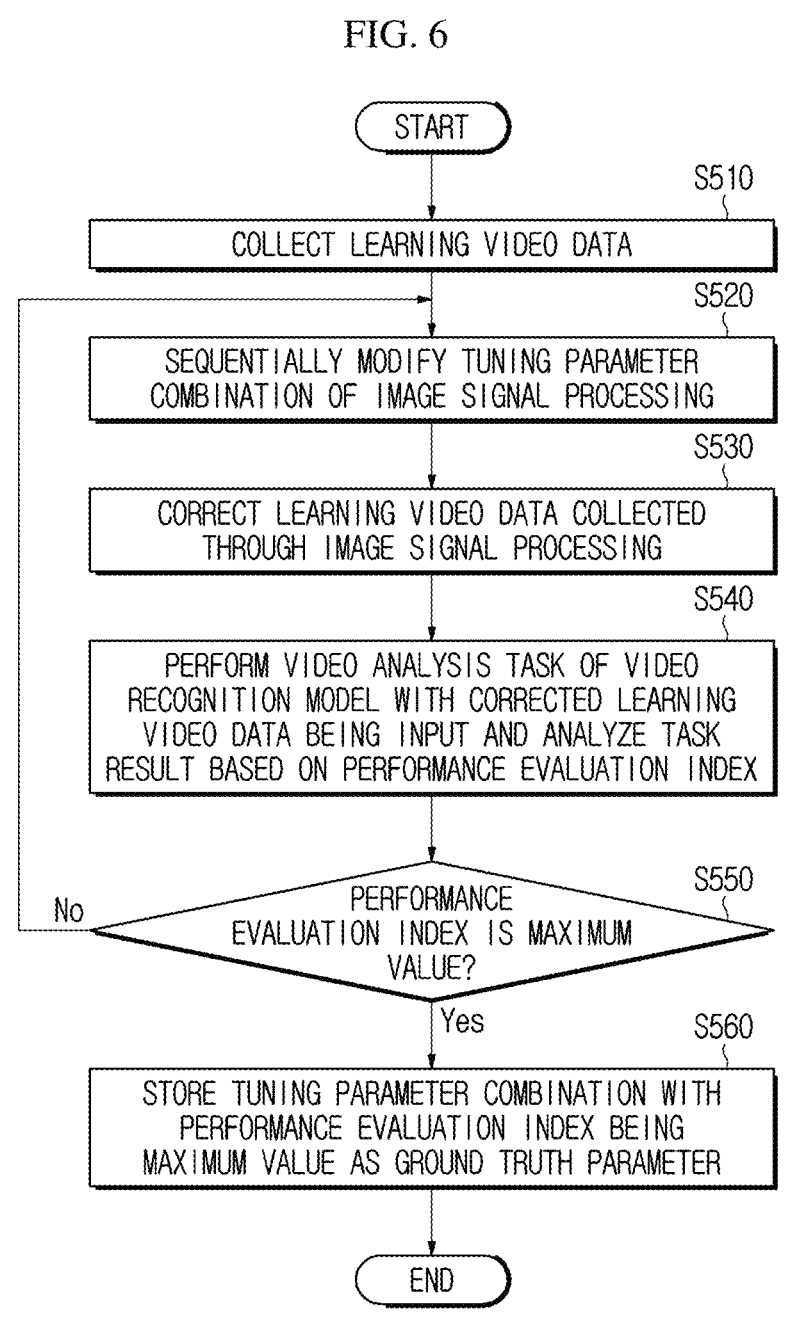

START

S510

COLLECT LEARNING VIDEO DATA

S520

SEQUENTIALLY MODIFY TUNING PARAMETER
COMBINATION OF IMAGE SIGNAL PROCESSING

S530

CORRECT LEARNING VIDEO DATA COLLECTED
THROUGH IMAGE SIGNAL PROCESSING

S540

PERFORM VIDEO ANALYSIS TASK OF VIDEO
RECOGNITION MODEL WITH CORRECTED LEARNING
VIDEO DATA BEING INPUT AND ANALYZE TASK
RESULT BASED ON PERFORMANCE EVALUATION INDEX

S550

PERFORMANCE
EVALUATION INDEX IS MAXIMUM
VALUE?

No

Yes

S560

STORE TUNING PARAMETER COMBINATION WITH
PERFORMANCE EVALUATION INDEX BEING
MAXIMUM VALUE AS GROUND TRUTH PARAMETER

END

FIG. 10

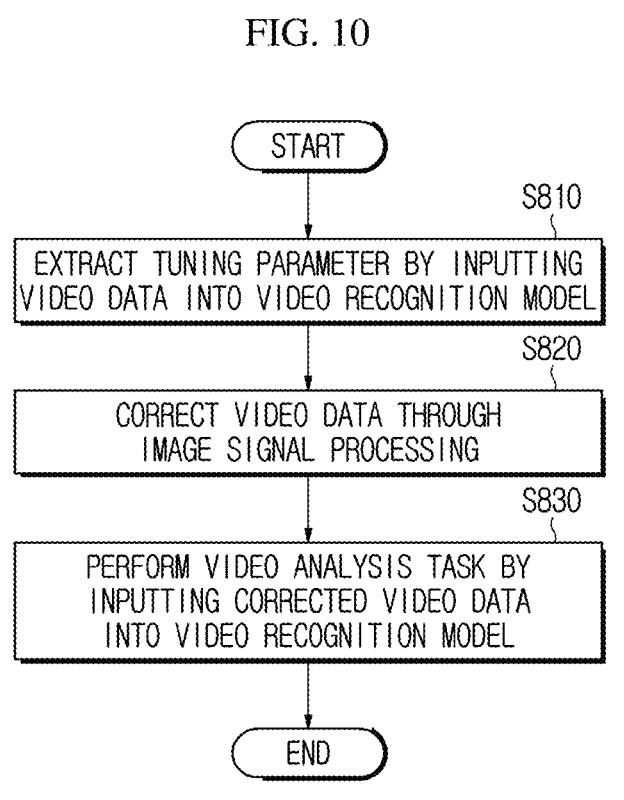

START

S810

EXTRACT TUNING PARAMETER BY INPUTTING
VIDEO DATA INTO VIDEO RECOGNITION MODEL

S820

CORRECT VIDEO DATA THROUGH
IMAGE SIGNAL PROCESSING

S830

PERFORM VIDEO ANALYSIS TASK BY
INPUTTING CORRECTED VIDEO DATA
INTO VIDEO RECOGNITION MODEL

END

METHOD AND DEVICE FOR VIDEO ANALYSIS BASED ON IMAGE CORRECTION LEARNING MODEL

CROSS REFERENCE TO RELATED APPLICATIONS

The present application claims priority to Korean provisional application No. 10-2024-0051462, filed Apr. 27, 2024, the entire contents of which are incorporated herein by reference for all purposes.

TECHNICAL FIELD

The present disclosure relates to a method and device for video analysis based on a learning model for image correction, and more particularly, to a method and device for video analysis based on a learning model for image correction, which perform a video analysis task after image signal processing (ISP) using a tuning parameter that is generated from a tuning parameter learning model.

BACKGROUND

At least some parameter tuning of image signal processing (ISP) for image correction through manual intervention of a user is set based on a subjective determination of the user's naked eye (e.g., subjective judgment), instead of an absolute criterion.

As a parameter of ISP is set according to the user's subjective determination, it is optimized for recognition through the user's naked eye but may have a negative effect on improving the performance of a video recognition model.

To improve the performance of a video recognition model, parameter tuning of ISP, which is used for video data correction, should be performed from the perspective of the video recognition model.

With the development of new camera modules, a user's manual intervention may spend a relatively longer time in parameter tuning of ISP than an automated algorithm.

For example, since an automated process of extracting a parameter for tuning ISP should be quickly performed in real time, an algorithm used herein needs to have a small amount of computation.

Additionally or alternatively, if a camera module is equipped with a separate chipset for extracting a tuning parameter or correcting an image, the camera module has hardware limitations and increases the cost of production, so that an existing video recognition controller needs to be used.

SUMMARY

The present disclosure may be technically directed to providing a method and device for video analysis based on a learning model for image correction, which perform a video analysis task after image signal processing (ISP) using a tuning parameter that is generated from a tuning parameter learning model.

The technical problems solved by the present disclosure are not limited to the above described technical problems. Other technical problems that are not described herein should be more clearly understood by a person having ordinary skill in the technical field, to which the present disclosure belongs, from the following description.

A method may be performed by an apparatus of a vehicle. The method may comprise: via a tuning parameter learning model for image correction, generating, by a processor of the apparatus and based on received video data, a tuning parameter for adjusting image signal processing (ISP) for correcting the received video data; correcting, based on the tuning parameter, the received video data; identifying, via a video recognition model, at least one object in at least one image corresponding to the corrected video data; and controlling, based on the identified at least one object, autonomous driving of the vehicle.

The tuning parameter learning model may be trained by using a ground truth parameter, wherein the ground truth parameter is determined based on an output of the video recognition model, wherein the output of the video recognition model is based on a result of a video analysis task associated with the corrected video data, and wherein the output of the video recognition model is generated using learning video data corrected via the ISP.

The ground truth parameter may comprise a tuning parameter that is determined by a performance evaluation index for evaluating the result of the video analysis task.

The tuning parameter for adjusting the ISP may comprise a plurality of tuning parameters for adjusting the ISP, and wherein the corrected learning video data comprises a plurality pieces of corrected learning video data generated based on a combination of the plurality of tuning parameters.

The ground truth parameter may be determined based on a combination of a plurality of tuning parameters applied to the ISP, and the combination of a plurality of tuning parameters applied to the ISP may correspond to an optimal value of a performance evaluation index for evaluating the result of the video analysis task.

The tuning parameter learning model may comprise a regression analysis model in which a factor is differently set according to a video analysis task associated with the corrected video data.

The tuning parameter learning model may comprise the video recognition model to which a tuning head network configured as a deep learning model is added for generating the tuning parameter.

A weight of the video recognition model may be frozen by the tuning parameter learning model, and the tuning parameter learning model may be trained based on a weight of the tuning head network being updated.

The tuning head network may have a factor that is differently set according to a video analysis task associated with the corrected video data, and the received video data may be determined based on at least one image frames captured by at least one camera of the vehicle.

The identifying the at least one object may comprise: determining a video analysis task associated with the corrected video data; and identifying the at least one object by using the video recognition model via an analysis head network, wherein the analysis head network is configured to provide a result associated with the video recognition model for the video analysis task.

The apparatus of a vehicle may comprise: a memory storing at least one instruction; and a processor configured to execute the at least one instruction, wherein the at least one instruction may be configured to cause, when executed by the processor, the apparatus to: via a tuning parameter learning model for image correction, generate, based on received video data, a tuning parameter for adjusting image signal processing (ISP) for correcting the received video data, correct, based on the tuning parameter, the received video data, identify, via a video recognition model, at least one object in at least one image corresponding to the corrected video data, and control, based on the identified at least one object, autonomous driving of the vehicle.

The at least one instruction may be configured to cause, when executed by the processor, the apparatus to: generate, using learning video data corrected through the ISP, an output of the video recognition model, wherein the output of the video recognition model is based on a result of a video analysis task associated with the corrected video data, determine, based on the output of the video recognition model, a ground truth parameter, and train, by using the ground truth parameter, the tuning parameter learning model.

The ground truth parameter may comprise a tuning parameter that is determined by a performance evaluation index for evaluating the result of the video analysis task.

The tuning parameter for adjusting the ISP may comprise a plurality of tuning parameters for adjusting the ISP, and wherein the corrected learning video data comprises a plurality pieces of corrected learning video data generated based on a combination of the plurality of tuning parameters.

The ground truth parameter may be determined based on a combination of a plurality of tuning parameters applied to the ISP, and the combination of a plurality of tuning parameters applied to the ISP may correspond to an optimal value of a performance evaluation index for evaluating the result of the video analysis task.

The tuning parameter learning model may comprise a regression analysis model in which a factor is differently set according to a video analysis task associated with the corrected video data.

The tuning parameter may be configured to be generated and received from a camera that is coupled to the apparatus and is equipped with the regression analysis model.

The tuning parameter learning model may comprise the video recognition model to which a tuning head network configured as a deep learning model is added for generating the tuning parameter.

The tuning parameter learning model may be configured to freeze a weight of the video recognition model, and the tuning parameter learning model may be trained based on a weight of the tuning head network being updated.

The tuning head network may have a factor that is differently set according to a video analysis task associated with the corrected video data, and the received video data may be configured to be determined based on at least one image frames captured by at least one camera of the vehicle.

The features of the present disclosure, which are briefly summarized herein, are only examples of aspects of features of the present disclosure and detailed description of the disclosure which follows and are not intended to limit the scope of the present disclosure.

The technical problems solved by the present disclosure are not limited to the above mentioned technical problems. Other technical problems solved by the present disclosure, which are not described herein should be more clearly understood by a person having ordinary skill in the art of technical field to which the present disclosure belongs, from the following description.

According to the present disclosure, it is possible to provide a method and device for video analysis based on a learning model for image correction, which perform a video analysis task after image signal processing (ISP) using a tuning parameter that is generated from a tuning parameter learning model.

In addition, according to the present disclosure, it is possible to improve the performance of a video recognition model by generating a tuning parameter that is used for video data correction.

In addition, according to the present disclosure, with the development of a new camera module, a required time for a user's manual intervention may be reduced by processing parameter tuning of ISP through an automated algorithm.

In addition, according to the present disclosure, a tuning parameter learning model for generating a tuning parameter may be installed in an existing component, with no separate hardware component added to a camera module, so that a production cost of a component may be reduced and a required time for ISP tuning for video data correction may be reduced.

The technical effects to be achieved by the present disclosure are not limited to the above technical effects, and other technical effects not stated herein will be clearly understood by a person having ordinary skill in the technical field, to which the present disclosure belongs, from the following description.

BRIEF DESCRIPTION OF THE DRAWINGS

FIG. 4 shows an example of a view showing detailed modules of a mobility device to which a video analysis method according to another example of the present disclosure is applied.

FIG. 6 shows an example of a flowchart showing a process of generating a ground truth parameter for training a tuning parameter learning model according to the present disclosure.

FIG. 10 shows an example of a flowchart showing a process of performing a video analysis task through ISP based on a video recognition model to which a tuning head network according to another example of the present disclosure is added.

DETAILED DESCRIPTION

Figures 1, 2:
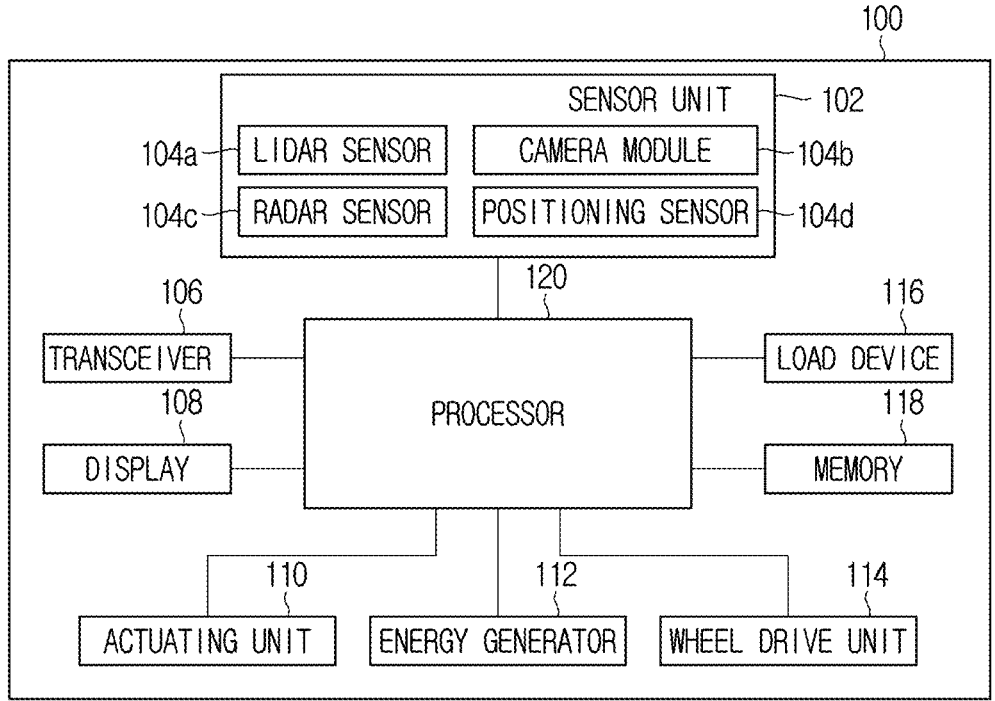
FIG. 1 shows an example of a view showing a mobility device communicating with another device to transmit and receive data.
FIG. 2 shows an example of a view showing constituent modules of a mobility device according to the present disclosure.

Herein after, examples of the present disclosure are described in detail with reference to the accompanying drawings so that those having ordinary skill in the art may easily implement the present disclosure. However, examples of the present disclosure may be implemented in various different ways and thus the present disclosure is not limited to the examples described therein.

In describing examples of the present disclosure, well-known functions or constructions have not been described in detail since a detailed description thereof may have unnecessarily obscured the gist of the present disclosure. The same constituent elements in the drawings are denoted by the same reference numerals and a repeated or duplicative description of the same elements has been omitted.

In the present disclosure, when an element is simply referred to as being "connected to", "coupled to" or "linked to" another element, this may mean that an element is "directly connected to", "directly coupled to", or "directly linked to" another element or this may mean that an element is connected to, coupled to, or linked to another element with another element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically stated otherwise. Accordingly, a first element in an example may be termed a second element in another example, and, similarly, a second element in an example could be termed a first element in another example, without departing from the scope of the present disclosure.

In the present disclosure, elements are distinguished from each other for clearly describing each feature, but this does not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. In addition, examples including other elements in addition to the elements described in the various examples are also included in the scope of the present disclosure.

The advantages and features of the present disclosure and the ways of attaining them should become apparent to those of ordinary skill in the art with reference to examples of the present disclosure described below in detail in conjunction with the accompanying drawings. The examples of the present disclosure, however, may be embodied in many different forms and should not be constructed as being limited to the example examples set forth herein. Rather, the examples described herein are provided to make this disclosure more complete and to fully convey the scope of the present disclosure to those having ordinary skill in the art to which the present disclosure pertains.

In the present disclosure, each of phrases such as "A or B", "at least one of A and B", "at least one of A or B", "A, B or C", "at least one of A, B and C", and each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and when drawings illustrated (or shown) in the present specification are inversed, the location relations described in the specification may be inversely understood. When a component, device, element, or the like of the present disclosure is described as having a purpose or performing an operation, function, or the like, the component, device, or element should be considered herein as being "configured to" meet that purpose or perform that operation or function.

A method may be performed by an apparatus, of a vehicle, for image correction based on a learning model. The method may comprise: generating, by a tuning parameter learning model for image correction, a tuning parameter for adjusting image signal processing (ISP) for correcting video data based on the video data; correcting the video data based on the tuning parameter; and performing a video analysis task on the corrected video data by using a video recognition model.

The tuning parameter learning model may learn by using a ground truth parameter that is determined based on a result of the video analysis task that is output from the video recognition model using learning video data corrected through the ISP.

The ground truth parameter is may a tuning parameter that is determined by a performance evaluation index for evaluating the result of the video analysis task.

The tuning parameter of the ISP may be configured in plurality, and wherein the corrected learning video data may be generated in plurality according to a combination of the plurality of the tuning parameter.

The ground truth parameter is may a combination of the tuning parameter that is applied to the ISP and is input when a maximum value of the performance evaluation index is calculated.

the tuning parameter learning model is a regression analysis model in which a factor is differently set according to the video analysis task.

The tuning parameter learning model is may a regression analysis model in which a factor is differently set according to the video analysis task.

The tuning parameter learning model is may the video recognition model to which a tuning head network configured as a deep learning model is added for generating the tuning parameter.

The tuning parameter learning model may freeze a weight of the video recognition model, and wherein the tuning parameter learning model may learned based on a weight of the tuning head network being updated.

The tuning head network may have a factor that is differently set according to the video analysis task.

The performing of the video analysis task by using the video recognition model may performed through an analysis head network that provides a result for the video analysis task of the video recognition model.

A video analysis device based on a learning model for image correction, the video analysis device may comprising: a memory configured to store at least one instruction; and a processor configured to execute the at least one instruction stored in the memory based on data obtained from the memory, wherein the processor is may further configured to: generate, by a tuning parameter learning model for image correction, a tuning parameter for adjusting image signal processing (ISP) for correcting video data based on the video data, correct the video data based on the tuning parameter, and perform a video analysis task on the corrected video data by using a video recognition model.

Hereinafter, referring to FIG. 1 and FIG. 2, a mobility device may be described to which a device for performing a video analysis task through image signal processing (ISP) using a tuning parameter learning model according to the present disclosure is applied.

FIG. 1 shows an example of a view exemplifying a mobility device communicating with another device to transmit and receive data.

Referring to FIG. 1, a mobility device 100 may be driven based on electric energy or fossil energy. In the case of electric energy, for example, the mobility device 100 may be a pure battery-based mobility driven by a high-voltage battery or employ a gas-based fuel cell as an energy source. Additionally or alternatively, the fuel cell may use various types of gas capable of generating electric energy, and for example, the gas may be hydrogen. For example, without being limited thereto, various gases may be applicable. In the case of fossil energy, the mobility device 100 may be driven based on fuels such as gasoline, diesel, or liquefied gas, and may be equipped with an engine that drives a wheel drive unit 114 by combustion of the fuel. The engine may be included in an energy generator 112 from a perspective of providing a driving torque of a wheel to the wheel drive unit 114.

For convenience of explanation, the present disclosure describes the mobility device 100 as an example mobility based on electric energy, but except regenerative braking, charge, and discharge described in the present disclosure, an example of the present disclosure may certainly be applicable to a mobility based on fossil energy.

The mobility device 100 may refer to a moving object capable of physically moving through space. The mobility device 100 may be a vehicle as a ground moving object driven on the ground and may be a normal passenger vehicle or commercial vehicle, a purpose built vehicle (PBV), and the like. The mobility device 100 may be a four-wheel vehicle, for example, a sedan, a sports utility vehicle (SUV), and a pickup truck and may be a vehicle with five or more wheels, for example, a bus, a lorry, a container truck, and a heavy vehicle. Additionally or alternatively, the mobility device 100 may include a means of aerial transportation such as an airplane, a drone, and a helicopter and, without being limited thereto, may include a means of transportation capable of moving in the sea such as a ship and a submarine.

The mobility device 100 may be driven by being controlled in autonomous driving, and the autonomous driving may be implemented as semi-autonomous driving or full autonomous driving. Full autonomous driving may be provided as autonomous moving under the complete control of a processor 120 of the mobility device 100 without a user's intervention even in an uncertain driving situation. Semi-autonomous driving may be provided as autonomous moving that requires a driver's intervention in a specific driving situation. If the driving situation occurs, semi-autonomous driving may be implemented such that the processor 120 disables autonomous driving and switches control to the user, and the user performs manual driving.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

According to the autonomous driving levels defined by the SAE, for example, semi-autonomous driving may correspond to the autonomous driving levels 1 to 4. For example, full autonomous driving may correspond to the level 5.

For example, the mobility device 100 may communicate with other devices 200 and 300 or another mobility device 400. For example, another device may include the server 200 for supporting various control, state management and driving of the mobility device 100, the ITS device 300 for receiving information from an intelligent transportation system (ITS), and various types of user devices. For example, the server 200 is an external device operated by a mobility manufacturer or provided for an autonomous driving service and may receive connected data of the mobility device 100 or transmit data necessary for autonomous driving. The server 200 may transmit various types of information and software modules used for controlling the mobility device 100 to the mobility device 100 as a response to a request and data transmitted from the mobility device 100 and a user device, for example, to support autonomous driving and various services for the mobility device 100. For example, the server 200 according to the present disclosure may transmit data for a tuning parameter learning model, which generates a tuning parameter applied to image signal processing (ISP) for correcting video data, to the mobility device 100. Additionally or alternatively, as described in the present disclosure, a method or device for performing a video analysis task through a tuning parameter learning model, which generates a tuning parameter, is mainly implemented in the mobility device 100 but is not limited thereto and may be implemented in every electronic device capable of generating and correcting an image of a mobile phone, a camera, a wearable device and the like.

For example, the ITS device 300 may be a road side unit (RSU), and the ITS device 300 may assist a user in driving his own car or support autonomous driving of the mobility device 100 by exchanging mobility recognition data, driving control and situation data, environment data surrounding a mobility, and map data through V2I with the mobility device 100. Through V2V with the another mobility device 400, the mobility device 100 may support a driver's driving his own car or autonomous driving by exchanging the above-listed data.

The mobility device 100 may communicate with another mobility or another device based on cellular communication, wireless access in vehicular environment (WAVE) communication, dedicated short range communication (DSRC) or short range communication, or any other communication scheme.

For example, the mobility device 100 may use Long-Term Evolution (LTE) as a cellular communication network, a communication network such as 5G, a WiFi communication network, a WAVE communication network, and the like to communicate with the server 200, the ITS device 300, and another mobility 400. As another example, DSRC used in the mobility device 100 may be used for mobility-to-mobility communication. For example, the mobility device 100 may use a communication device, such as a modem, a network adapter, a radio transceiver, an antenna, etc., that is capable of communicating via one or more wired or wireless communication protocols, such as Ethernet, Wi-Fi, near-field communication (NFC), Bluetooth, LTE, 5G New Radio (NR), vehicle-to-everything (V2X), etc. A communication scheme among the mobility device 100, the server 200, the ITS device 300, another mobility device 400, and a user device is not limited to the above-described example.

Although not shown, the mobility device 100 may receive image data taken by a capturing device fixed at a specific position or a mobile capturing device through the above-described means of communication.

FIG. 2 shows an example of a view showing constituent modules of a mobility according to the present disclosure.

The mobility device 100 may include a sensor unit 102, a transceiver 106, a display 108, an actuating unit 110, an energy generator 112, a wheel drive unit 114, a load device 116, a memory 118, and a processor 120. Each constituent element is not a necessary constituent element, an additional configuration may be provided or omitted, and one configuration may be included in another configuration or be combined therewith so that a single configuration may perform a plurality of functions.

For example, according to an example and another example of the present disclosure, the mobility device 100 may generate a tuning parameter and have a video analysis device that corrects video data based on the tuning parameter and performs a video analysis task from the corrected video data by using a video recognition model. For example, the video analysis device may mean a device that is connected or coupled with the memory 118, the processor 120 and the camera 104b and is capable of performing the above-described processing.

The sensor unit 102 may be equipped with various types of detectors for sensing various states and situations occurring in external and internal environments of the mobility device 100 and for identifying location information of the mobility device 100. For example the sensor unit 102 may be configured as a multiple sensor module including heterogeneous sensors to obtain sensing data detected from each of the sensors.

For example, the sensor unit 102 may be equipped with a Lidar sensor 104a, a camera 104b as a video sensor, and a radar sensor 104c for recognizing dynamic and static objects present around the mobility device 100 and have a positioning sensor 104d capable of obtaining location information of the mobility device 100. The sensor unit 102 may obtain sensor data including three-dimensional recognition data, perception/observation data, and positioning information by the above-described sensors. A three-dimensional (3D) perception sensor corresponds to Lidar data, and these two terms may be used interchangeably below. Perception/observation data may include image data for a camera and radar data.

The Lidar sensor 104a may be a type of 3D recognition sensor according to the present disclosure, and the terms 'Lidar sensor' and '3D recognition sensor' may be used interchangeably below. The Lidar sensor 104a may be a sensor that observes a surrounding environment based on laser scanning and perceives a three-dimensional shape of an object. For example, the Lidar sensor 104a may obtain three-dimensional recognition data for a surrounding environment and an object by scanning laser around the mobility device 100. Three-dimensional recognition data may include a point cloud representing a three-dimensional shape of an object, that is, detection data and image data for observation representing a surrounding environment.

For example, a point cloud may comprise a collection of data points in a three-dimensional coordinate system, representing the external surface of an object or environment. Each point in the cloud may have its own set of X, Y, and Z coordinates, and/or additional information (e.g., color or intensity). Point clouds may be typically generated by 3D scanners, LiDAR, or photogrammetry techniques, and may be used in various applications such as 3D modeling, computer vision, and/or robotics, etc. They may provide a highly detailed and/or accurate representation of complex surfaces and/or structures, making them ideal for tasks like object recognition, environment mapping, and/or digital reconstruction, etc.

For example, detection data may be provided to identify each object by representing three-dimensional contours and shapes of objects and an arrangement of objects. For example, image data may be provided to identify an object and a surrounding environment through images of the object and the surrounding environment.

The camera module 104b may obtain two-dimensional (2D) video data or video data with depth information for an environment and an object around the mobility device 100. The camera module 104b according to the present disclosure may include a monocular camera or a multi-camera. Additionally or alternatively, the camera module 104 according to the present disclosure may generate video data by converting passing light into an electric signal. According to an example of the present disclosure, the camera module 104b may generate a tuning parameter, which is applied to ISP, from the video data, and the processor 120 may correct the video data through ISP based on the tuning parameter. Furthermore, the processor 120 may perform a video analysis task on the corrected video data by using a video recognition model. This may be described in detail below. Additionally or alternatively, the above-described processing of the camera module 104*b* and the processor 120 according to an example of the present disclosure may be uniformly performed in a video analysis device. For example, the radar sensor 104*c* may irradiate an electromagnetic wave with a predetermined wavelength and detect a behavior of an object based on an electromagnetic wave reflected from the object. For example, the behavior of an object may include the presence of the object, whether the object moves, a distance between the mobility device 100 and the object, a speed of the object, and a movement direction.

Apart from the positioning sensor 104*d*, the sensor unit 102 may be equipped with a gyro sensor, an acceleration sensor, a wheel sensor, an autometer, a speed sensor and the like, in order to identify its own location, driving position, and speed. Additionally or alternatively, to monitor a user inside the mobility device 100, a condition of an occupant, and an operating situation of an internal device of the mobility device 100 that a user is capable of maneuvering, the sensor unit 102 may have an inward-facing camera module 104*b*, a biosensor for detecting biosignals of a driver and an occupant, and various detection modules for detecting the operation and state of an internal device.

The present disclosure mainly describes sensors of the sensor unit 102 referred to for description of an example but may further include a sensor for detecting various situations not listed herein.

The transceiver 112 may support mutual communication with the server 200, the ITS device 300, and the neighbor mobility device 400. In the present disclosure, video data or learning model data may be transmitted to the server 200, while video data or learning model data may be received from the server 200. In the present disclosure, the mobility device 100 may transmit and receive data used in the method according to the present disclosure to and from the outside through the transceiver 116. According to an example of the present disclosure, the learning model data may be a tuning parameter learning model that generates a tuning parameter.

The display 108 may serve as a user interface. By the processor 120, the display 108 may display an operating state and a control state of the mobility device 100, path/traffic information, information on an energy remaining quantity, a content requested by a driver, and the like to be output. The display 108 may be configured as a touch screen capable of sensing a driver input and receive a request of a driver indicated to the processor 120.

A user may activate or deactivate an autonomous driving function through a soft-type interface like a touch of the display 108 or a hard-type interface provided in a predetermined position inside the mobility device 100. In the case of a hard-type interface, for example, a button or key for an autonomous driving function may be installed on a steering wheel, a dashboard, and the like. Additionally or alternatively, the interfaces may be configured to provide detailed options for selecting various functions provided at a corresponding level of autonomous driving.

Meanwhile, the mobility device 100 may include the actuating unit 110, the energy generator 112, the wheel drive unit 114, and the load device 116.

The actuating unit 110 may be equipped with at least one module for implementing a driving operation and perform at least one driving operation of longitudinal control like acceleration/deceleration and transverse control like steering. The actuating unit 110 may be equipped with not only a pedal and a steering wheel accepting a user's request for the control but also various operating modules for generating a driving operation according to the request in the wheel drive unit 114.

The energy generator 112 may generate and supply power and electricity used for a driving power system like the wheel drive unit 114 and the load device 116. In case the mobility device 100 is driven based on electric energy, for example, the energy generator 112 may be configured as an electric battery or be configured as a combination of an electric battery and a fuel cell for charging the battery. In the case of a combination of an electric battery and a fuel cell, the energy generator 112 may include a tank for storing a material used to produce power of the fuel cell, for example, hydrogen gas. In case the mobility device 100 is driven based on fossil energy, the energy generator 112 may be configured as an internal combustion engine.

The wheel drive unit 114 may include a plurality of wheels, a driving force transfer module for generating and giving a driving force to wheels or for transferring a driving force, a braking module for decelerating the driving of wheels, and a steering module for realizing transverse control of wheels. In case the mobility device 100 is driven based on electric energy, a driving force transfer module may be configured as a motor module that generates a driving force based on electric power output from an electric battery. In case the mobility device 100 is operated based on fossil energy, a driving force transfer module may be equipped with transmission and a gear module that transfer power of an internal combustion engine.

The load device 116 may be an auxiliary equipment mounted on the mobility device 100, which consumes power supplied from the energy generator 112 by use of an occupant or user or converted from output of the energy generator 112. In the present disclosure, the load device 116 may be a type of electric device for non-driving purpose excluding a driving power system like the wheel drive unit 114. For example, the load device 114 may be various devices installed in an air-conditioning system, a light system, a seat system and the mobility device 100.

Additionally or alternatively, the mobility device 100 may include a memory 118 and the processor 120.

The memory 118 may store an application for controlling the mobility device 100 and various data and load the application or read and record data at a request of the processor 120. In the present disclosure, the memory 118 may store an application and at least one instruction that perform a video analysis task by using a video recognition model with an input of corrected video data. Additionally or alternatively, the memory 118 may store an application and at least one instruction that generate a tuning parameter for adjusting ISP for correcting video data based on video data and correct the video data based on the tuning parameter through a tuning parameter learning model for video image correction and perform a video analysis task from the corrected video data by using a video recognition model.

The memory 118 may have a completely-learned video recognition model that performs a video analysis task by using corrected video data as input. According to the present disclosure, a video recognition model may be used to extract a ground truth parameter that is provided for learning of a tuning parameter learning model for generating a tuning parameter. Additionally or alternatively, according to another example of the present disclosure, as a tuning head network is added, a video recognition model may generate a tuning parameter through the tuning head network without using a separate tuning parameter learning model. This may be described in detail below. The video recognition model may have been learned based on 3D recognition data, video data, radar data, and location data that are already collected from the mobility device 100, the server 200 and another mobility device 400, and for example, the video recognition model may be a deep neural network lie a convolutional neural network (CNN). The server 200 may update the video recognition model and the tuning parameter learning model based on the above-described data that are recognized in real time during driving.

The processor 120 may perform overall control of the mobility device 100. The processor 120 may be configured to execute an application and an instruction stored in the memory 118. The processor 120 may activate autonomous driving in response to an autonomous driving request by a user or a setting of the vehicle 100 itself and control the vehicle 100 to activate autonomous driving at a level applied to the vehicle 100. Additionally or alternatively, the processor 120 may deactivate autonomous driving by a user's release or at a request according to automatic release and control the vehicle 100 to be manually driven.

In the present disclosure, the processor 120 may perform a video analysis task by using a video recognition model with an input of corrected video data and using an application, an instruction and data stored in the memory 118. Additionally or alternatively, by using an application, an instruction and data stored in the memory 118, the processor 120 may generate a tuning parameter for adjusting ISP for correcting video data based on video data and correct the video data based on the tuning parameter by using a tuning parameter learning model for correcting video image and perform a video analysis task from the corrected video data by using a video recognition model.

Hereinafter, through FIG. 3, according to an example of the present disclosure, a module to which video analysis is applied through video data corrected through ISP may be described.

Figure 3:
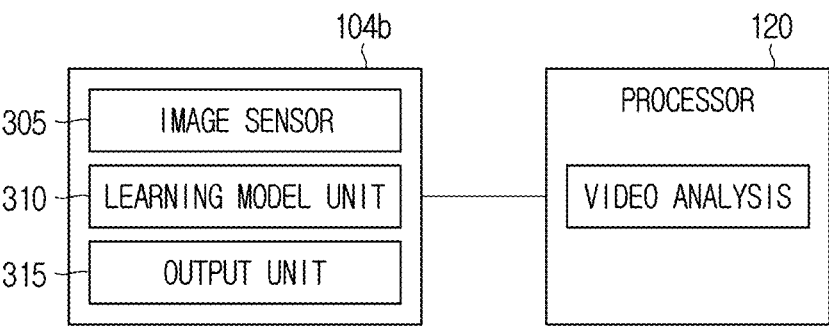
FIG. 3 shows an example of a view showing detailed modules of a mobility device to which a video analysis method according to an example of the present disclosure is applied.

FIG. 3 shows an example of a view showing detailed modules of a mobility device to which a video analysis method according to an example of the present disclosure is applied. A video analysis method according to an example of the present disclosure may be performed through the camera module 104b and the processor 120 of the mobility device 100. The camera module 104b may include an image sensor 305, a learning model unit 310, and an output unit 315. Each constituent element is not a necessary constituent element, an additional configuration may be provided or omitted, and one configuration may be included in another configuration or be combined therewith so that a single configuration may perform a plurality of functions.

For example, the camera module 104b may further have a controller to adjust a location along an optical axis for adjusting a focus of the image sensor 305 or perform correction of video data generated from the image sensor 305. For example, the camera module 104b may output corrected video data by performing correction of video data that is generated from the output unit 315.

Additionally or alternatively, a video analysis method according to an example of the present disclosure may be uniformly processed in a video analysis device that may be connected or coupled with or include the above-described configuration.

Hereinafter, for convenience of explanation, in a video analysis method according to an example of the present disclosure, by way of example, generation of a tuning parameter may be described to be performed in the camera module 104b, and correction of video data may be described to be performed in the processor 120.

According to the present disclosure, the image sensor 305 of the camera module 104b may collect an optical signal of a subject in all directions. For example, the image sensor 305 may generate video data by converting the collected optical signal into an electric signal. The image sensor 305 may include a lens unit for collecting an optical signal, and the lens unit may consist of at least one or more lenses. The learning model unit 310 of the camera module 104b may have a tuning parameter learning module for generating a tuning parameter based on the generated video data. The tuning parameter may be applied for adjusting ISP for correcting the video data based on video data. The output unit 315 generates a tuning parameter applied to ISP by inputting the video data to the tuning parameter learning model.

According to an example of the present disclosure, the processor 120 may correct the video data based on the tuning parameter generated from the output unit 315 and perform a video analysis task on the corrected video data by using a video recognition model.

As for the above-described processing in the processor 120 involved with performing correction of video data through ISP based on a generated tuning parameter and the video data correction performed in the output unit 315 of the camera module 104b, the processes of the two configurations 120 and 315 may be identical to each other. For example, for convenience of explanation, video data correction in FIG. 5 may be described mainly through the processing of the processor 120.

Hereinafter, according to another example of the present disclosure, the above-described process may be described to be performed in the processor 120 of the mobility device 100, while the camera module 104b is not equipped with any separate module for generating a tuning parameter.

FIG. 4 shows an example of a view showing detailed modules of a mobility device to which a video analysis method according to another example of the present disclosure is applied.

The video analysis method according to another example of the present disclosure may be performed through the processor 120 of the mobility device 100. The processor 120 may include a shared backbone unit 405, a video recognition head unit 410, a video correction unit 415, and a parameter head unit 420. Each constituent element may not be a necessary constituent element, an additional configuration may be provided or omitted, and one configuration may be included in another configuration or be combined therewith so that a single configuration may perform a plurality of functions.

For example, a video analysis method according to another example of the present disclosure may be uniformly processed in a video analysis device that is coupled or connected with or include the above-described configuration.

The shared backbone unit 405 may extract a detailed feature map from video data by using a video recognition model. The video recognition head unit 410 may provide a result of a video analysis task based on the extracted detailed feature map. Specifically, the shared backbone unit 405 may extract the detailed feature map through shared layers of the video recognition model.

The parameter head unit 420 may generate a tuning parameter based on the detailed feature map extracted from the shared backbone unit 405, and the video correction unit

415 may correct video data through ISP using the tuning parameter. Additionally or alternatively, the video recognition head unit 410 may provide the result of the video analysis task based on the corrected video data.

For example, the parameter head unit 420 may generate a tuning parameter through an added tuning head network of a video recognition model and be learned based on result analysis for a video analysis task of the video recognition head unit 410 according to a learning video data input to the shared backbone unit 405.

Figure 8:
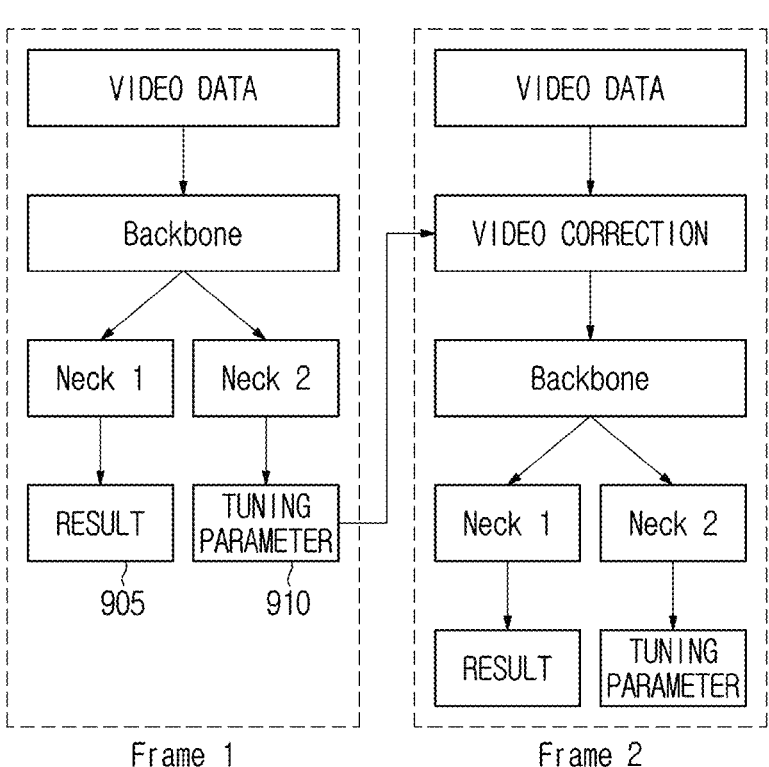
FIG. 8 shows an example of a schematic diagram showing frames for generating a tuning parameter from a tuning head network added to a video recognition model according to another example of the present disclosure and for performing a video analysis task using the tuning parameter.
Figure 9:
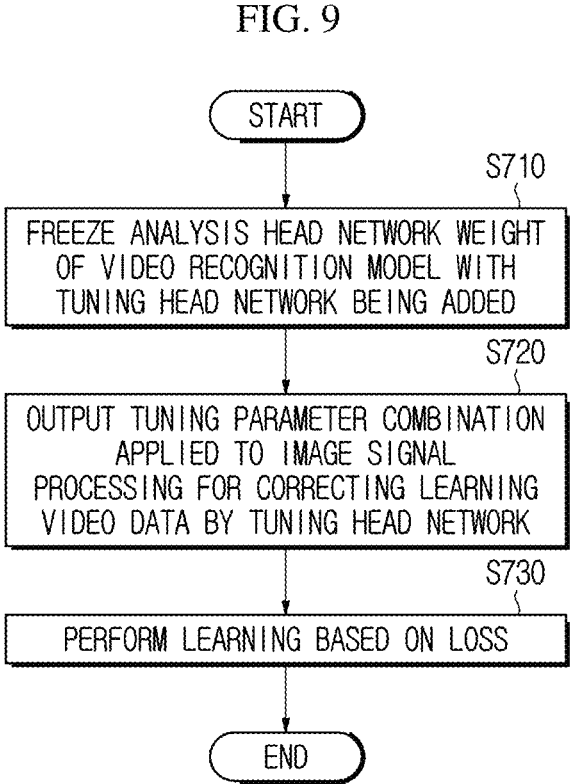
FIG. 9 shows an example of a flowchart showing a learning process for generating a tuning parameter based on a video recognition model to which a tuning head network according to another example of the present disclosure is added.

According to another example of the present disclosure, a process of generating a tuning parameter, performing a video analysis task and learning a tuning head network may be described in detail through FIG. 8 to FIG. 10.

Hereinafter, a process of generating a tuning parameter reflected in ISP for correcting video data and performing a video analysis task using the corrected video data may be described through FIG. 5.

A detection model (e.g., a neural network) may include at least one backbone, at least one neck for a backbone, and a head. The backbone may exploit the essential features of different resolutions, and the neck may fuse the features of different resolutions. At least one head may perform the detection of objects in different resolutions.

A backbone network may be used in the Object detection model architectures. Backbone may be responsible for extracting and encoding features from the input data. It may act as the core feature extractor, capturing low-level and high-level features from the input data.

A neck may be responsible for further transforming and refining the features extracted by the backbone model. The neck may improve the backbone's extracted features, and give more informative feature representations.

The backbone may be responsible for the initial feature extraction from the input data, while the neck enhances and merge those features to improve the model's performance.

The head may include task-specific layers that are designed to produce the final prediction or inference based on the information extracted by the Backbone and Neck.

Figure 5:
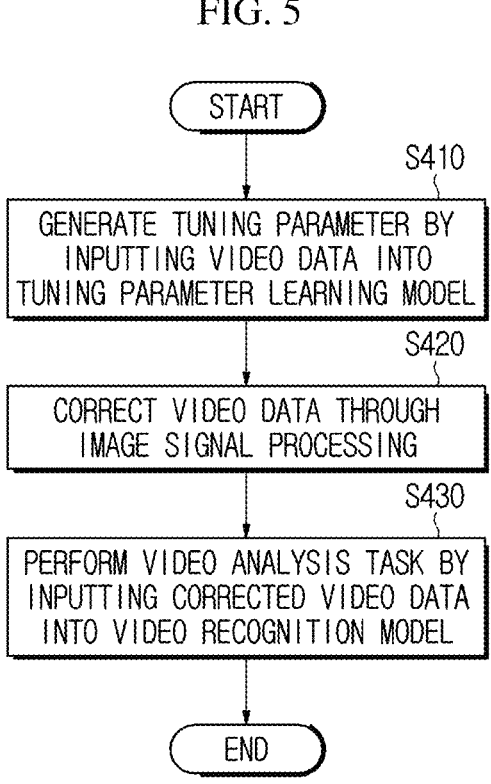
FIG. 5 shows an example of a flowchart showing a process of performing a video analysis task through image signal processing (ISP) using a tuning parameter learning model according to an example of the present disclosure.

FIG. 5 shows an example of a flowchart showing a process of performing a video analysis task through image signal processing (ISP) using a tuning parameter learning model according to an example of the present disclosure.

The camera module 104*b* may generate a tuning parameter by inputting video data into a tuning parameter learning model (S410). A regression model with a small amount of computation, which may be mounted in the camera module 104*b*, may be used as the tuning parameter learning model.

A regression model in machine learning may comprise a type of predictive model that estimates the relationship between input variables (also called independent variables or features) and a continuous output variable (also called the dependent variable or target). The goal of a regression model is to predict a numerical value based on input data. The model analyzes the patterns in the data to make accurate predictions about future values. Common types of regression models include linear regression, which assumes a straight-line relationship between inputs and output, and more complex models like polynomial regression or logistic regression for more advanced cases.

If a regression model with a small amount of computation is used for a process of automatically generating a parameter for tuning image signal processing (ISP), a processing process described below may be performed quickly in real time. A tuning parameter may mean a combination of parameters reflected in a filter, a transform matrix, and interpolation that may be used for a correction process through ISP such as noise reduction, color correction, gamma correction, demosaicing and sharpness enhancement of video data, etc.

A tuning parameter learning model may be learned (e.g., trained) using a ground truth parameter that may be obtained from a video recognition model that performs a video analysis task (e.g., object detection, semantic segmentation, etc.). This process may be described in detail through FIG. 6 and FIG. 7.

For example, a ground truth parameter may comprise a reference value or set of values that may represent the correct or actual state of something in a machine learning model. Ground truth parameters may be used to train models by providing accurate, labeled data that the model may learn from.

According to an example of the present disclosure, the camera module 104*b* may generate a tuning parameter in real time according to a video data input by using a tuning parameter learning model that is a regression model with a small amount of computation. A tuning parameter may be reflected in ISP to maximize (or improve) the performance of a video analysis task of a video recognition model and be differently set according to video data and each video analysis task.

The processor 120 may correct the video data through ISP (S420). For example, the correction may be described to be processed in the processor 120, but the present disclosure is not limited to the processing in the processor 120, which may be performed in the camera module 104*b*.

The correction may include noise reduction, color correction, gamma correction, demosaicing and sharpness enhancement of video data, and the processor 120 may control, through the above-described correction, the quality of the video data to be suitable for performing a video analysis task.

The processor 120 may perform the video analysis task by inputting the corrected video data into the video recognition model (S430). For example, the video recognition model may comprise a deep neural network (e.g., Residual Network (ResNet), You Only Look Once (YOLO), U-Net, and Convolutional Neural Network (CNN), etc.). The video analysis task may include every task of analyzing an object included in video data based on information obtainable from the object. For example, the video analysis task may include object detection, semantic segmentation, action recognition, emotion analysis, text extraction, and video classification and is not limited to the above-described example.

Figure 7:
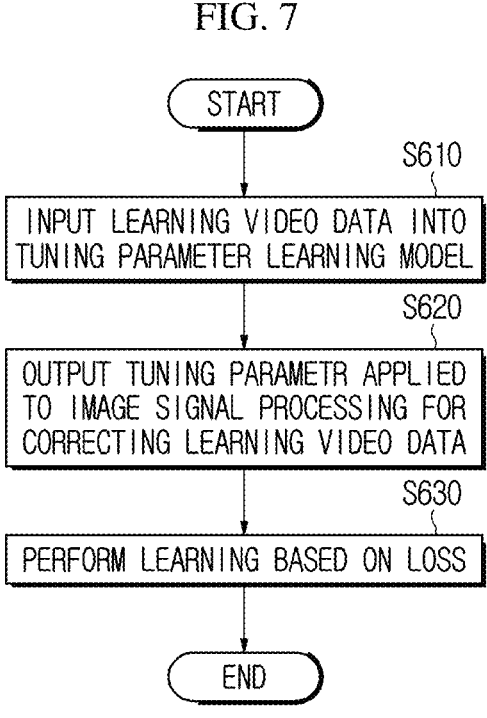
FIG. 7 shows an example of a flowchart showing a process of training a tuning parameter learning model by using a ground truth parameter according to an example of the present disclosure.

Through FIG. 6 and FIG. 7, a process of training a tuning parameter learning model for extracting a tuning parameter may be described in detail.

FIG. 6 shows an example of a flowchart showing a process of generating a ground truth parameter for training a tuning parameter learning model according to the present disclosure.

According to the present disclosure, the tuning parameter learning model may be learned in the server 200 but may not be limited thereto and may be learned in the mobility device 100.

Hereinafter, learning of a tuning parameter learning model for generating a tuning parameter may be described with focus on the processing of the server 200.

The server 200 may collect learning video data (S510). The learning video data may be already stored in the server 200.

The server 200 may sequentially modify a tuning parameter combination that may be reflected in ISP (S520). For example, the server 200 may sequentially modify a tuning parameter combination comprising parameter values reflected in ISP such as noise reduction, color correction, gamma correction, demosaicing, sharpness enhancement, correction of brightness, chroma and luma, etc. This process may comprise extracting a parameter combination that may maximize (or improve) the performance of a video analysis task. The meaning of 'sequentially' (or the term 'sequentially') is not limited to modifying the parameter values in a time series order (or a time-based order). For example, the server 200 may adjust and/or combine some parameter values instead of a combination of all the parameter values that may be reflected in ISP.

The server 200 may correct learning video data through ISP by reflecting a tuning parameter combination (S530), perform a video analysis task by inputting the corrected learning video data into a video recognition model, and analyze a task result based on a performance evaluation index (S540). The corrected learning video data may be sequentially generated by ISP based on a modified tuning parameter combination, as the tuning parameter combination of ISP may be sequentially modified.

The video recognition model may refer to an artificial intelligence (AI) model with a fixed weight according to a video analysis task, which may be, a completely learned AI model. The video recognition model according to the present disclosure may include a different model according to a video analysis task. By performance evaluation of the video recognition model, the server 200 may check whether or not a tuning parameter combination is suitable for a video analysis task using the video recognition model.

For example, in the case of correction based on a user's subjective determination, it may not be possible to identify which correction of video data into a bright image with much noise or a dark image with little noise produces better performance in video analysis.

The server 200 may perform a video analysis task according to a task learned by the video recognition model based on corrected learning video data and determine whether correction by ISP according to the parameter combination may be suitable for the video analysis task, based on a performance evaluation index suitable for the video analysis task.

For example, in the case of object detection, the server 200 may analyze a video analysis task result by using an intersection over union (IOU), a mean average precision (MAP), or a Euclidean distance. For example, an IOU may comprise a measured ratio of an overlapping area between a bounding box that may mark an area of a recognized object and an actual bounding box. For example, a bounding box may comprise a rectangular box that may be used in computer vision to define the location and size of an object within an image or video. The bonding box may be useful in tasks (e.g., object detection, etc.), where the goal may be to identify and/or localize objects. The bounding box may surround the object by specifying its position using coordinates, marking the top-left and bottom-right corners. This may allow systems to know precisely where an object is located in the frame. Bounding boxes may help quantify how accurately an object is detected.

For example, an MAP may comprise a predicted accuracy of a class such as a type of object. For example, an MAP may be calculated based on a relation between a precision determined according to a match rate between a predicted result for a class of a detected object and ground truth data of the class of the detected object and a recall rate determined according to a match rate between a predicted result for a class of a detected object and ground truth data of an object to be detected.

The server 200 may check whether or not a performance evaluation index is a maximum value (S550). For example, the server 200 may compare performance evaluation indexes calculated by the above-described process. If a performance evaluation index calculated by a current step is higher than a performance evaluation index calculated by a previous step, the server 200 may store a tuning parameter combination reflected in the current step and repeat it. For example, the server 200 may respond to a user setting or perform a predetermined epoch according to a preset number of repetitions and store a tuning parameter combination for a maximum value among calculated performance evaluation indexes.

For example, a user setting may comprise a configurable option or preference within a system, application, or device, etc. that may allow users to customize their experience according to their needs. By modifying user settings, individuals may tailor the functionality or appearance of a system to better suit their preferences or requirements.

For example, an epoch in machine learning may comprise one complete cycle through the entire training dataset by the model. During an epoch, the model may process all the training data once and update its internal parameters, such as weights, based on the errors it may encounter. The number of epochs may vary depending on the complexity of the task.

The server 200 may store a tuning parameter combination of a case with a maximum performance evaluation index as a ground truth parameter (S560). For example, the server 200 may store a tuning parameter combination applied to ISP as a ground truth parameter.

The ground truth parameter may be determined based on a performance evaluation index of a video recognition model with exclusion of a user's subjective determination, providing an absolute criterion optimized for video analysis performance.

Hereinafter, according to an example of the present disclosure, a process of training a tuning parameter learning model based on a ground truth parameter may be described through FIG. 7.

FIG. 7 shows an example of a flowchart showing a process of training a tuning parameter learning model by using a ground truth parameter according to an example of the present disclosure.

The server 200 may input learning video data into the tuning parameter learning model (S610) and output a parameter combination applied to ISP that may correct the learning video data (S620). According to an example of the present disclosure, the server 200 may use a regression model with a small amount of computation as the tuning parameter learning model. The server 200 may calculate a tuning parameter combination suitable for a specific video analysis task by analyzing the size, location, boundary, rate, class, color and luma of an object in the learning video data.

The server 200 may compare the calculated tuning parameter combination and a ground truth parameter to determine whether or not learning is required. If the learning is required, the server 200 may perform learning of the tuning parameter learning model by using a loss function (S630). In machine learning, a loss function (also known as a cost function or error function) is a method of evaluating how well a specific algorithm models the given data. By comparing the predicted values generated by the model to the actual target values, the loss function quantifies the error or difference. The purpose of the loss function is to guide the training process. If the model makes a prediction, the loss function computes a numerical value representing how far the prediction is from the true value. The goal of the learning algorithm is to minimize this loss value by adjusting the model's parameters during the training phase.

The camera module 104*b* of the mobility device 100 may use the completely-learned tuning parameter learning model to generate a tuning parameter in real time which may maximize (or improve) the performance of video analysis in various driving environments such as day, night, backlight and bad weather environments.

Hereinafter, according to another example of the present disclosure, for convenience of understanding as to the processing of FIG. 2, a whole frame of generating a tuning parameter from a tuning head network added to a video recognition model and of performing a video analysis task may be described through FIG. 8.

FIG. 8 shows an example of a schematic diagram showing frames for generating a tuning parameter from a tuning head network added to a video recognition model according to another example of the present disclosure and for performing a video analysis task using the tuning parameter.

For convenience of understanding, Frame 1 and Frame 2 mean an illustration of data input and output processes of a video recognition model through two frames according to another example of the present disclosure but do not mean the use of models with different structures for extracting a tuning parameter and performing a video analysis task.

Frame 1 shown in FIG. 8 shows an example of a schematic diagram of the input and output of a video recognition model during a process of generating a tuning parameter.

Preemptively, during a learning process of a video recognition model according to another example of the present disclosure, the video recognition model may determine a ground truth parameter based on a result of an analysis head network 905 that may perform a video analysis task. The process of determining a ground truth parameter may be the same as the processing of FIG. 6. For example, the server 200 may determine a ground truth parameter based on a video task result of the analysis head network 905 by inputting learning video data, which may be corrected through ISP according to a tuning parameter combination, into a video recognition model.

The server 200 may input learning video data into a video recognition model, output a parameter combination through the added tuning head network 910, and learn the tuning head network 910 through comparison with the ground truth parameter.

Referring to Frame 1, if the learning the tuning head network 910 is completed and used to perform a video analysis task, the processor 120 may input video data into the video recognition model and generate a tuning parameter from the tuning head network 910. Referring to Frame 2, the processor 120 may input video data, which may be corrected through ISP based on the generated tuning parameter, into the video recognition model again and perform a video analysis task.

Since the analysis head network 905, which may perform a video analysis task, and the tuning head network 910, which may be learned (or trained) based on the video analysis task and generate a tuning parameter, share layers of a same backbone, the above-described process may be processed in the processor 120. Neither separate software for ISP nor a corresponding hardware module is required to be provided so that component costs and required time may be reduced.

Hereinafter, a learning process of a tuning head network added for generating a tuning parameter may be described through FIG. 9.

FIG. 9 shows an example of a flowchart showing a learning process for generating a tuning parameter based on a video recognition model to which a tuning head network according to another example of the present disclosure is added.

Although the server 200 may separately train a tuning parameter learning model and generate a tuning parameter as described in FIG. 7, a tuning head network may be added to a video recognition model so that a tuning parameter may be automatically and more easily generated in the processor 120, while no separate module is added to the camera module 104*b* to generate a tuning parameter.

For example, the server 200 may freeze a weight of an analysis head network that outputs a video analysis task of a video recognition model to which a tuning head network is added (S710). For example, in machine learning, 'freeze' may refer to the process of preventing certain layers or parts of a neural network from updating their weights during the training process. If a layer is "frozen," it means that the weights in that layer are kept constant and do not change in response to backpropagation. This is done to preserve the learned information in those layers while allowing other parts of the model to continue learning and adjusting their weights.

The server 200 may freeze a weight of a backbone of the video recognition model in order not to affect an existing video analysis task. The analysis head network may be used to determine a ground truth parameter through processing that may be the same as described in FIG. 6.

For example, the server 200 outputs, by an added tuning head network, a tuning parameter combination applied to ISP that corrects learning video data (S720). The server 200 may compare the calculated tuning parameter combination and the ground truth parameter and performs learning based on loss (S730).

For example, to learn (or train) the tuning head network, the server 200 may update the weight of the tuning head network through processing that may be the same as in FIG. 7. For example, a ground truth parameter may be determined based on an analysis head network, and a tuning head network may be learned (or trained) based on the ground truth parameter.

Hereinafter, a process of performing a video analysis task using a video recognition model, to which a tuning head network is added, may be described through FIG. 10.

FIG. 10 shows an example of a flowchart showing a process of performing a video analysis task through ISP based on a video recognition model to which a tuning head network according to another example of the present disclosure is added.

The processor 120 may generate a tuning parameter by inputting video data into a video recognition model (S810). A tuning parameter may mean a combination of parameters reflected in a filter, a transform matrix, and/or interpolation that may be used for a correction process through ISP such as noise reduction, color correction, gamma correction, demosaicing and sharpness enhancement of video data, etc.

The video recognition model may perform a video analysis task (e.g., object detection, semantic segmentation, etc.) and has already been learned (or trained).

For example, according to another example of the present disclosure, the processor 120 may generate a tuning parameter from a tuning head network added to the video recognition model in real time according to a video data input. A tuning parameter may be reflected in ISP to maximize (or improve) the performance of a video analysis task of a video recognition model and be differently set according to video data and each video analysis task. For example, in the tuning head network, a different factor may be set according to a video analysis task. The factor may comprise a weight and bias of the added tuning head network.

The processor 120 may correct the video data through ISP (S820). For example, the processor 120 may correct the video data by using a tuning parameter generated from the tuning head network.

The processor 120 may perform the video analysis task by inputting the corrected video data into the video recognition model again (S830). The video analysis task may include object detection, semantic segmentation, action recognition, emotion analysis, text extraction, and/or video classification and is not limited to the above-described example.

While the methods of the present disclosure described above are represented as a series of operations for clarity of description, it is not intended to limit the order in which the steps are performed. The steps described above may be performed simultaneously or in different order as necessary. In order to implement the method according to the present disclosure, the described steps may further include different or other steps, may include remaining steps except for some of the steps, or may include other additional steps except for some of the steps.

The various examples of the present disclosure do not disclose a list of all possible combinations and are intended to describe representative aspects of the present disclosure. Aspects or features described in the various examples may be applied independently or in combination of two or more.

Additionally or alternatively, various examples of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed is:

1. A method performed by an apparatus of a vehicle, the method comprising:

via a tuning parameter learning model for image correction, generating, by a processor of the apparatus and based on received video data, a tuning parameter for adjusting image signal processing (ISP) for correcting the received video data;

correcting, based on the tuning parameter, the received video data;

identifying, via a video recognition model, at least one object in at least one image corresponding to the corrected video data; and controlling, based on the identified at least one object, autonomous driving of the vehicle, wherein the tuning parameter learning model comprises a regression analysis model in which a factor is differently set according to a video analysis task associated with the corrected video data.

2. The method of claim 1, wherein the tuning parameter learning model is trained by using a ground truth parameter, wherein the ground truth parameter is determined based on an output of the video recognition model, wherein the output of the video recognition model is based on a result of a video analysis task associated with the corrected video data, and wherein the output of the video recognition model is generated using learning video data corrected via the ISP.

3. The method of claim 2, wherein the ground truth parameter comprises a tuning parameter that is determined by a performance evaluation index for evaluating the result of the video analysis task.

4. The method of claim 2, wherein the tuning parameter for adjusting the ISP comprises a plurality of tuning parameters for adjusting the ISP, and wherein the corrected learning video data comprises a plurality pieces of corrected learning video data generated based on a combination of the plurality of tuning parameters.

5. The method of claim 4, wherein the ground truth parameter is determined based on a combination of a plurality of tuning parameters applied to the ISP, and wherein the combination of a plurality of tuning parameters applied to the ISP corresponds to an optimal value of a performance evaluation index for evaluating the result of the video analysis task.

6. The method of claim 1, wherein the tuning parameter learning model comprises the video recognition model to which a tuning head network configured as a deep learning model is added for generating the tuning parameter.

7. The method of claim 6, wherein a weight of the video recognition model is frozen by the tuning parameter learning model, and wherein the tuning parameter learning model is trained based on a weight of the tuning head network being updated.

8. The method of claim 6, wherein the tuning head network has a factor that is differently set according to a video analysis task associated with the corrected video data, and wherein the received video data is determined based on at least one image frame captured by at least one camera of the vehicle.

9. The method of claim 6, wherein the identifying the at least one object comprises:

determining a first video analysis task associated with the corrected video data; and identifying the at least one object by using the video recognition model via an analysis head network, wherein the analysis head network is configured to provide a result associated with the video recognition model for the first video analysis task.

10. An apparatus of a vehicle, the apparatus comprising:

a memory storing at least one instruction; and a processor configured to execute the at least one instruction, wherein the at least one instruction is configured to cause, when executed by the processor, the apparatus to:

via a tuning parameter learning model for image correction, generate, based on received video data, a tuning parameter for adjusting image signal processing (ISP) for correcting the received video data, correct, based on the tuning parameter, the received video data, identify, via a video recognition model, at least one object in at least one image corresponding to the corrected video data, and control, based on the identified at least one object, autonomous driving of the vehicle, wherein the tuning parameter learning model comprises a regression analysis model in which a factor is differently set according to a video analysis task associated with the corrected video data.

11. The apparatus of claim 10, wherein the at least one instruction is configured to cause, when executed by the processor, the apparatus to:

generate, using learning video data corrected through the ISP, an output of the video recognition model, wherein the output of the video recognition model is based on a result of a video analysis task associated with the corrected video data, determine, based on the output of the video recognition model, a ground truth parameter, and train, by using the ground truth parameter, the tuning parameter learning model.

12. The apparatus of claim 11, wherein the ground truth parameter comprises a tuning parameter that is determined by a performance evaluation index for evaluating the result of the video analysis task.

13. The apparatus of claim 11, wherein the tuning parameter for adjusting the ISP comprises a plurality of tuning parameters for adjusting the ISP, and wherein the corrected learning video data comprises a plurality pieces of corrected learning video data generated based on a combination of the plurality of tuning parameters.

14. The apparatus of claim 13, wherein the ground truth parameter is determined based on a combination of a plurality of tuning parameters applied to the ISP, and wherein the combination of a plurality of tuning parameters applied to the ISP corresponds to an optimal value of a performance evaluation index for evaluating the result of the video analysis task.

15. The apparatus of claim 10, wherein the tuning parameter is configured to be generated and received from a camera that is coupled to the apparatus and is equipped with the regression analysis model.

16. The apparatus of claim 10, wherein the tuning parameter learning model comprises the video recognition model to which a tuning head network configured as a deep learning model is added for generating the tuning parameter.

17. The apparatus of claim 16, wherein the tuning parameter learning model is configured to freeze a weight of the video recognition model, and wherein the tuning parameter learning model is trained based on a weight of the tuning head network being updated.

18. The apparatus of claim 16, wherein the tuning head network has a factor that is differently set according to a video analysis task associated with the corrected video data, and wherein the received video data is configured to be determined based on at least one image frame captured by at least one camera of the vehicle.

19. An apparatus comprising:

a memory storing at least one instruction; and a processor configured to execute the at least one instruction, wherein the at least one instruction is configured to cause, when executed by the processor, the apparatus to:

via a tuning parameter learning model for image correction, generate, based on received video data, a tuning parameter for adjusting image signal processing (ISP) for correcting the received video data, correct, based on the tuning parameter, the received video data, identify, via a video recognition model, at least one object in at least one image corresponding to the corrected video data, and control, based on the identified at least one object, an operation of a vehicle, wherein a tuning head network is associated with the tuning parameter learning model for generating the tuning parameter, wherein the tuning head network has a factor that is differently set according to a video analysis task associated with the corrected video data, and wherein the received video data is configured to be determined based on at least one image frame captured by at least one camera of the vehicle.

20. The apparatus of claim 19, wherein the tuning parameter learning model is configured to freeze a weight of the video recognition model, and wherein the tuning parameter learning model is trained based on a weight of the tuning head network being updated.

* * * * *